(No Model.)
E. HUBER.
TRACTION WHEEL.
No. 303,286. Patented Aug. 12, 1884.
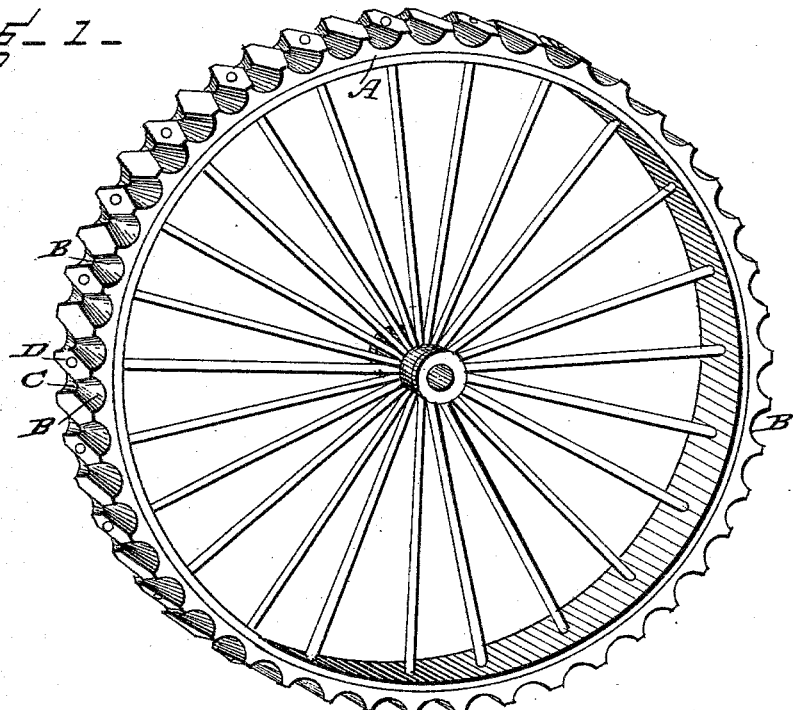
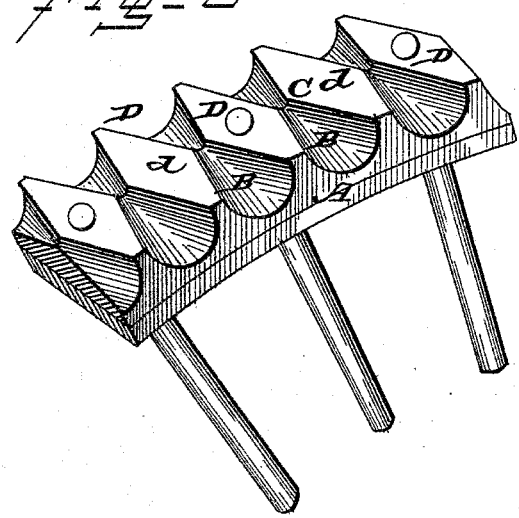
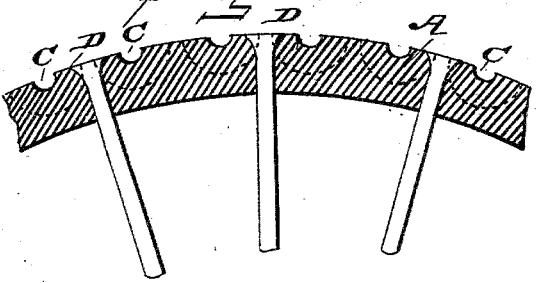
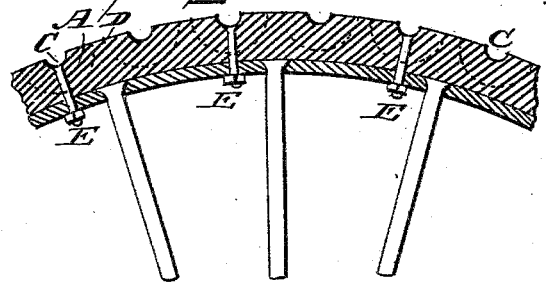
WITNESSES:
Fred G. Dieterich
Wm Bagger
INVENTOR.
Edward Huber
by Louis Bagger & Co
ATTORNEYS.

UNITED STATES PATENT OFFICE.

EDWARD HUBER, OF MARION, OHIO.

TRACTION-WHEEL.

SPECIFICATION forming part of Letters Patent No. 303,286, dated August 12, 1884.

Application filed May 12, 1884. (No model.)

*To all whom it may concern:*

Be it known that I, EDWARD HUBER, a citizen of the United States, and a resident of Marion, in the county of Marion and State of Ohio, have invented certain new and useful Improvements in Traction-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved traction-wheel. Fig. 2 is a similar view showing a portion of the rim or tire of the same on an enlarged scale. Fig. 3 is a sectional view showing the tire in one part with the body of the wheel, and Fig. 4 is a similar view showing the tire made separately therefrom and bolted to the fellies or rim.

Similar letters of reference indicate corresponding parts in all the figures.

My invention has relation to traction-wheels for traction-engines, harvesters, and all other kinds of machinery, implements, or appliances using traction-wheels; and it consists in the improved construction of a wheel of that class, which will be hereinafter more fully described and claimed.

In the accompanying drawings, A denotes the rim or tire, in the construction of which my improvement consists.

By reference to the drawings it will be seen that the face of the tire is cut away to form conical recesses B in the nature of hollow frusta, intersecting one another in pairs, as shown at C at their apexes, each set or pair being separated from the pair next to it by lozenge-shaped projections D, which form the true face of the wheel. From the widest part or middle part $d$ of these lozenge-shaped projections or platforms D the recesses B B taper gradually in width and depth to opposite sides of the wheel from the point C, at which they meet or intersect. By this construction I provide a wheel which is well adapted for muddy and sandy roads, and at the same time equally well adapted for hard and smooth roads. The recesses B B are so constructed that when the wheel runs in the mud or sand it will force the same outward, and thus clear itself as it revolves. At the same time the peculiar shape of the tread or face of the wheel operates to compress the ground, when soft or yielding, so that the wheel will get a better hold than a traction-wheel of the ordinary construction under similar circumstances. When the wheel is running on hard and smooth roads, the central widest part, $d$, of the raised lozenge-shaped sections D give it a firm bearing, so that it will not unnecessarily cut or injure the roads.

A traction-engine having my improved wheels may be used upon an asphalt pavement and other artificial pavements without doing the least injury thereto.

The tire may either be made in one piece, having the spokes inserted into the recesses B, as in Fig. 3; or my improved tire may be made separately from the wheel in separable sections, which are bolted upon the rim by bolts E, as shown in Fig. 4.

Having thus described my invention, I claim and desire to secure by Letters Patent of the United States—

1. A traction-wheel having its rim or tire cut or shaped to form the frusta B B, intersecting each other in pairs at their reduced ends, the several pairs of intersecting frusta being separated from one another by the lozenge-shaped platforms D, forming the true face or bearing-surface of the wheel, substantially as set forth.

2. As an improvement in traction-wheels, the metallic tire A, cut or shaped to form the frusta B B, intersecting each other in pairs at their reduced ends, the several pairs of intersecting frusta being separated from one another by the lozenge-shaped platforms D, forming the true face or bearing-surface of the tire, substantially as set forth.

In testimony that I claim the foregoing as my own I have hereunto affixed my signature in presence of two witnesses.

EDWARD HUBER.

Witnesses:
J. E. DAVIDS,
O. J. JOHNSON.